United States Patent
Ikumoto et al.

[11] Patent Number: 5,461,993
[45] Date of Patent: Oct. 31, 1995

[54] TRACTOR-DRAWN DIRECT SEED SOWING APPARATUS

[75] Inventors: Junichi Ikumoto; Akio Yasuda, both of Okayama, Japan

[73] Assignee: Minoru Industrial Company, Limited, Okayama, Japan

[21] Appl. No.: 159,437

[22] Filed: Nov. 30, 1993

[30] Foreign Application Priority Data

Nov. 30, 1992 [JP] Japan ................... 4-355284
Apr. 15, 1993 [JP] Japan ................... 5-114012

[51] Int. Cl.$^6$ ................................... A01C 5/00
[52] U.S. Cl. ............... 111/52; 111/133; 111/62; 111/59
[58] Field of Search .............. 111/52, 59, 62, 111/63, 131, 133, 144, 145, 146; 172/459, 415, 416, 417

[56] References Cited

U.S. PATENT DOCUMENTS

| | | | |
|---|---|---|---|
| 554,013 | 2/1896 | Weeks | 111/62 |
| 882,379 | 3/1908 | Gilbreath | 111/62 |
| 1,176,020 | 3/1916 | Bangert | 111/62 |
| 1,233,760 | 7/1917 | Dickinson | 111/52 |
| 2,640,405 | 6/1953 | Wheeler | 111/62 |
| 3,398,707 | 8/1968 | McClenny | 111/144 |
| 3,454,285 | 7/1969 | Van Peursem | 111/52 |
| 4,034,687 | 7/1977 | van der Lely | 111/133 |
| 4,506,609 | 3/1985 | Fuss et al. | 111/52 X |
| 5,095,832 | 3/1992 | Rumbaugh | 111/52 X |
| 5,158,411 | 10/1992 | Kemmner | 111/131 |

*Primary Examiner*—Randolph A. Reese
*Assistant Examiner*—Victor Batson
*Attorney, Agent, or Firm*—Koda and Androlia

[57] ABSTRACT

A tractor-drawn seed sowing apparatus including a seed sower which travels on a ground surface while furrowing with furrow-cutting claw wheels, a power transmitter connected to a tractor so as to transmit a driving force of the tractor to the seed sower, and a coupler which connects the seed sower to the power transmitter, and the coupler is made of vertically and horizontally arranged linkages so that the seed sower can make up-and-down, pitching, rolling and yawing motions on irregular ground surfaces.

10 Claims, 6 Drawing Sheets

TRACTOR-DRAWN DIRECT SEED SOWING APPARATUS

BACKGROUND OF THE INVENTION

1. Field of the Invention

The present invention relates to a tractor-drawn direct seed sowing apparatus for sowing seeds such as seed rice, etc. in unplowed fields.

2. Prior Art

The Japanese Utility Model Application Publication ("Kokoku") No. 50-37287 assigned to the assignee of this United States patent application discloses one of the apparatuses for sowing seeds such as seed rice, etc. in unplowed fields. This conventional seed sowing apparatus is shown in FIG. 7.

The main frame 1 of the sowing apparatus includes front and rear (or drive) wheels 2 and 3, and a handle 4 mounted to the rear portion of the main frame 1. The rear wheels 3 are driven by an engine 5. Claw wheels 6 are provided on the front portion of the main frame 1 so that they make sowing furrows in the ground. The claw wheels 6 rotate in the direction opposite from the rotational direction of the rear wheels 3. In other words, the claw wheels 6 rotate opposite to the traveling direction of the sowing vehicle. In addition, a guide cover 7 is installed above the claw wheels so that the soil thrown up by the claw wheels 6 is guided behind. A seed tank 8a that has a seed feeder 8b is installed on the main frame 1, and the seed feeder 8b has a seed-drop 8c with its bottom opened behind the claw wheels 6.

The apparatus described above is an engine-driven "walking" type sowing apparatus and has good working characteristics and efficiency in small-sized unplowed fields. Recently, however, the scale of cultivated areas has increased greatly, and as a result the demand for efficient, energy-saving farm equipment has grown greater than before.

SUMMARY OF THE INVENTION

Accordingly, the object of the present invention is to provide a tractor-drawn direct seed sowing apparatus which, while traveling, sows seeds such as seed rice, etc. with extremely good efficiency and in an energy-saving manner in large-scale unplowed fields. In other words, the object of the present invention is to provide a tractor-drawn direct seed sowing apparatus which can make even depth furrows and sow seeds in the unplowed irregular ground.

The object of the present invention is accomplished by a unique structure for a tractor-drawn seed sowing apparatus that includes a seed sower that sows seeds while traveling and making sowing furrows in the ground via furrow-cutting claw wheels, a power transmitter connected to a tractor or a pulling vehicle so as to transmit the rotating power from the tractor to the claw wheels of the seed sower, and a coupler which connects the seed sower to a tractor in a manner that the coupler allows the sower to make various motions including up-and-down, pitching and rolling motions on the ground.

The seed sower is equipped with furrow-cutting claw wheels which rotate in the direction opposite from the seed sower's traveling direction, a soil guide cover installed above the furrow-cutting claw wheel, and a seed conduit positioned behind the furrow-cutting claw wheel.

According to the present invention, a plurality of seed sowers can be connected to the power transmitter, and the couplers used for this connection allows the respective seed sower to make independent motions of up-and-down, pitching and rolling motions on the irregular ground surface. The coupler is also constructed so that it allows each sower to make a yawing motion.

More specifically, the coupler includes arms which are connected to the power transmitter in such a manner that the arms can make an up-and-down swing motion, rolling motion and horizontal swing motion, and the seed sower is connected to the ends of the arms so that the seed sower can make a vertical rotational motion.

Even more specifically, the coupler includes a cylindrical member provided in a horizontally rotatable fashion relative to the power transmitter, a horizontal tubing provided inside the cylindrical member in a rotatable fashion, connecting pins horizontally connected to the horizontal tubing, and a pair of lift arms rotatably connected to both ends of the connecting pins. With this structure, the seed sower is connected to the rear ends of the lift arms so as to rotate in a vertical direction.

In addition, the seed sower is equipped with wheels installed in the front and the rear so that the seed sower can stand by itself and travel on the ground, and the furrow-cutting claw wheels are installed between the front and rear wheels so that the furrow-cutting claw wheels rotate in the direction opposite from the rotational direction of the front and rear wheels. Soil guide covers are installed above the furrow-cutting claw wheels, and seed conduits are installed behind the furrow-cutting claw wheels. In addition, the rear wheels are positioned so that they can pass over the sowing furrows that are made by the furrow-cutting claw wheels.

Generally, in seed sowers that sow seeds while cutting sowing furrows in the ground, it is necessary to form the furrows at an even depth. In the tractor-drawn seed sower of the present invention, the coupler which connects the seed sower to the power transmitter (that is connected to a pulling vehicle) is designed so that the coupler allows the seed sower to make up-and-down, pitching (inclination in the fore-aft direction) and rolling (inclination in the left-right direction) motions. Accordingly, the seed sower can travel on the ground while moving up and down and inclining in close conformity to the irregularities of the ground surface. Accordingly, the furrow-cutting claw wheels can cut more or less perpendicularly into the ground at all times even if the ground surface is very irregular, and the cutting depth of the furrow-cutting claw wheels can be uniform.

A plurality of seed sowers can be pulled by a single tractor via couplers, and even in this case, the seed sowers can be pulled in close conformity to the irregularities of the ground surface because the seed sower can move up-and-down and pitch and roll independently of each other. Accordingly, even in the unplowed field which contains numerous irregularities, the cutting depth made by the furrow-cutting claw wheels of the plurality of seed sowers can be uniform.

Furthermore, since the coupler allows the seed sower to make a horizontal swing (or yawing) motion, the seed sower can smoothly follow the traveling path of the tractor without swinging too widely in the direction opposite to the direction the tractor is turning. Accordingly, the seed sower can change its traveling direction easily.

Furthermore, the seed sower can stand by itself and travel on the ground by the front and rear wheels. Accordingly, it is possible to obtain a smooth tractor-pulled traveling of the seed sower while it pitches and rolls on the uneven ground surface and to maintain the furrow-cutting claw wheels at the same level to make even depth furrows.

Moreover, with the rear wheels set in positions to pass over the furrows made by the furrow-cutting claw wheels, the rear wheels can act as pressing wheels that apply a weight to the covering soil dropped into the sowing furrows.

DETAILED DESCRIPTION OF THE INVENTION

Figure 1:
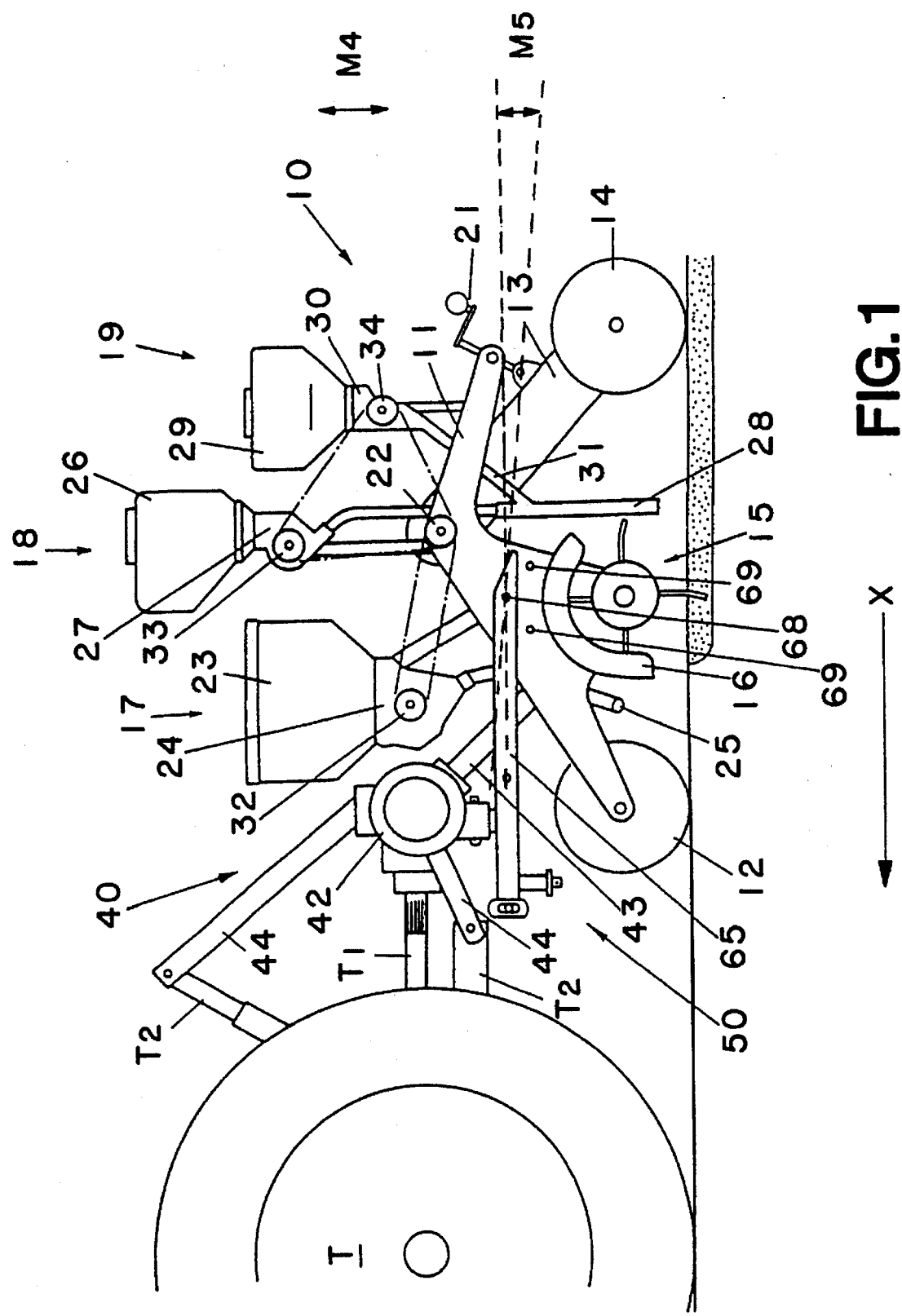
FIG. 1 is a side view of the direct seed sowing apparatus according to the present invention coupled to a tractor.

The tractor-drawn seed sowing apparatus of the present invention will be described below with reference to FIGS. 1 through 6. The description will be relative to two seed sowers pulled by a single tractor or pulling vehicle.

The seed sower 10 includes a pair of somewhat reversed V shape chassis 11, a front wheel 12 provided at the front ends (left ends in FIG. 1) of the chassis 11, a chain case 13 pivotally connected to the chassis 11 at the upper end, and left and right rear wheels 14 provided at the bottom of the chain case 13. Thus, the direct seed sower 10 is supported by the front and rear wheels 12 and 14 to stand by itself and travel on the ground.

In addition, left and right furrow-cutting claw wheels 15 are rotatably mounted to the bottom of the downwardly extended central portions of the chassis 11. These wheels 15 are rotated in the direction shown by an arrow F in FIG. 5 that is opposite from the traveling direction X of the seed sower 10.

Figure 4:
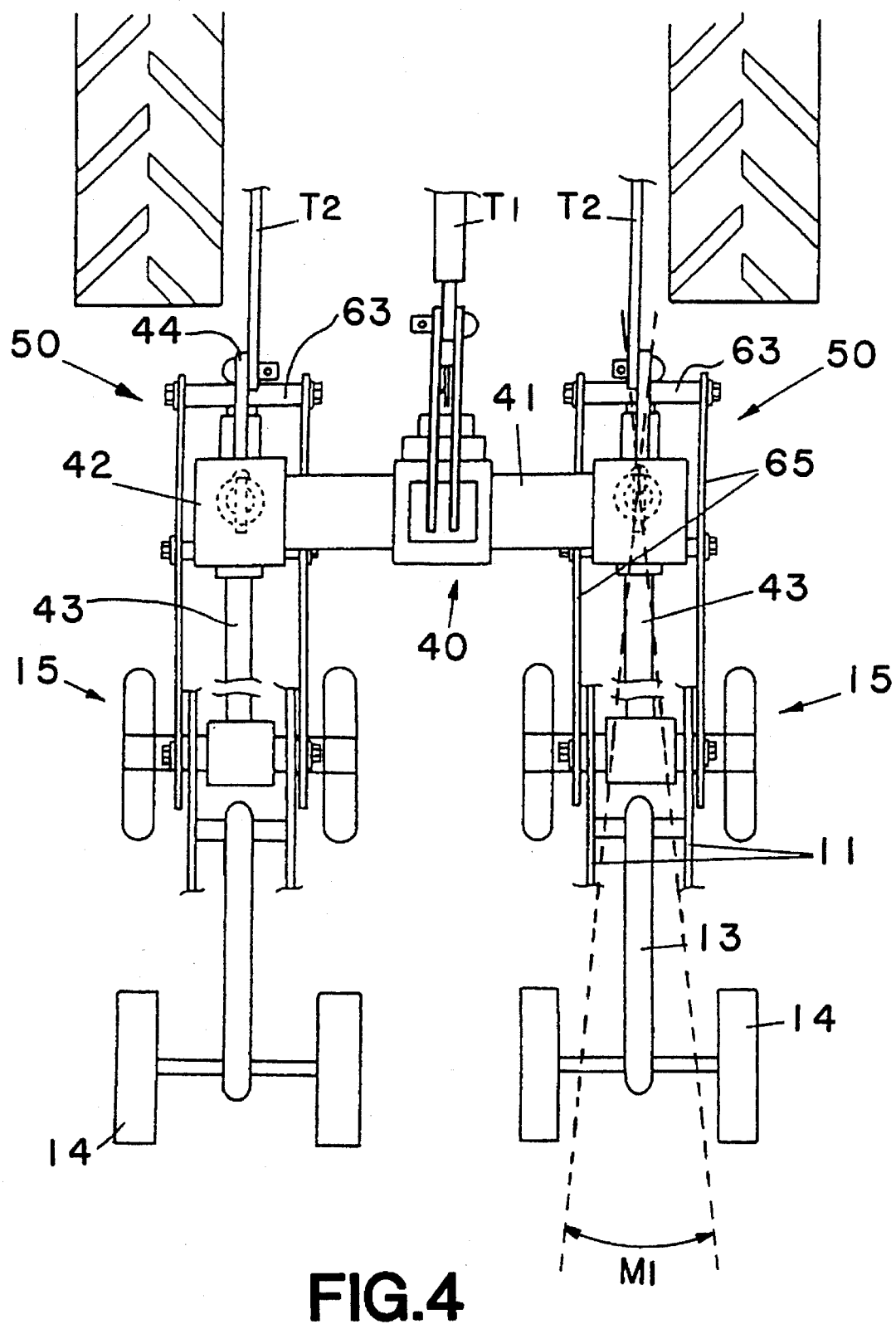
FIG. 4 is a top view of a plurality of seed sowers coupled to a tractor.

As best seen in FIG. 4, the two rear wheels 14 are positioned directly behind the furrow-cutting claw wheels 15 so that the rear wheels 14 can pass over the sowing furrows made by the furrow-cutting claw wheels 15.

Left and right guide covers 16 are installed at the bottom of the central portion of the chassis 11 so that they cover the claw wheels 15.

Furthermore, the sower 10 has a depth adjusting lever 21 installed between the chassis 11 and the chain case 13. The depth of the furrows which the furrow-cutting claw wheels 15 make is adjusted by changing the height of the rear wheels 12 by varying the angle between the chassis 11 and the chain case 13. A chain mechanism (not shown) which rotates a pulley 22 in linkage with the rear wheels 14 is installed in the chain case 13.

In addition, a fertilizer-supply 17 which supplies fertilizer to the areas in front of the furrow-cutting claw wheels 15 is provided on the seed sower 10. A seed-supply 18 which supplies seeds to the areas behind the furrow-cutting claw wheels 15 and a chemical-supply 19 which supplies chemical agents to the areas behind the furrow-cutting claw wheels 15 are also provided on the seed sower 10.

The fertilizer-supply 17 includes a fertilizer tank 23, a fertilizer feeder 24 and fertilizer spreading tube 25. The seed-supply 18 includes a seed tank 26, a seed feeder 27 and a seed dropping tube 28. The chemical agent spreading tubes 31 extend from the chemical feeder 30 of the chemical supply 19 and merge into the seed dropping tube 28. Each one of the devices 24, 27 and 30 feeds out a predetermined amount of fertilizer, etc. at a predetermined rate when pulleys 32, 33 and 34 are rotated via the belt-connected pulley 22.

A power transmitter 40 is provided so that it is portioned between the sower 10 and a tractor T that pulls the sower 10. The power transmitter 40 includes a transmission casing 41 that houses a drive shaft (not shown) driven in linkage with the output shaft T1 of the tractor T.

As best seen in FIG. 4, a pair of gear boxes 42 are installed on both ends of the transmission casing 41, and each one of the gear boxes 42 houses transmission mechanisms (not shown).

A transmission axle 43 extends rearwardly from each gear box 42 and is connected to the claw wheel axle so that it transmits a rotary driving force to the furrow-cutting claw wheels 15. With this driving force, the claw wheels 15, as described above, are rotated in the direction F which is opposite from the traveling direction X of the seed sower 10.

A connecting bar 44 is extended forwardly from the transmission casing 41 and connected to connecters T2 of the tractor T.

A coupling means or a coupler 50 connects the seed sower 10 to the power transmitter 40. In the drawings, two seed sowers 10 are independently coupled to a single power transmitter 40 by two couplers 50.

Figure 3A:
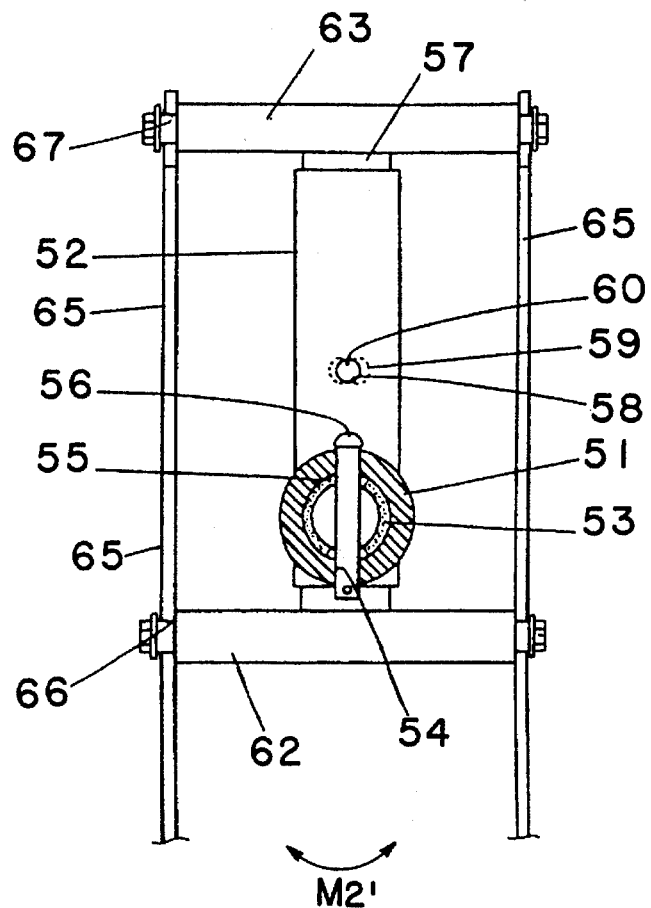
FIG. 3a is a top view of an essential portion of the coupler and FIG. 3b is a front view thereof.

More specifically, a vertical cylinder 51 is provided on the under surface of each one of the gear boxes 42 so as to open downwardly, and as best seen in FIG. 3a, pin holes 54 are formed in the front and rear walls of the vertical cylinder 51.

A swing tube 53 is provided on the upper surface of a horizontal cylinder 52 so as to extend upwardly and to be loosely inserted into the vertical cylinder 51. The horizontal cylinder 52 is provided on a horizontal tubing 57 which is fixed to two pin members 62 and 63 that are provided between a pair of lift arms 65. The lift arms 65 are connected, as described below, at the rear ends to the chassis 11 of the sower 10 by pins 68.

The swing tube 53, as best seen in FIG. 3a, is provided with laterally elongated pin holes 55 on the front and rear walls, and these elongated holes 55 are aligned with the pin holes 54 of the vertical cylinder 51 so that a pin 56 is inserted into these pin holes 54 and 55. The edge of the laterally elongated pin holes 55 can slide laterally along the pin 56. In other words, the swing tube 53 can rotate inside the vertical cylinder 51 within the range defined by the laterally elongated pin holes 55.

As a result, the horizontal cylinder 52 is connected to the vertical cylinder 51 via the pin 56 a manner so that the horizontal cylinder 52 can horizontally rotate with the swing tube 53 within the range defined by the laterally elongated pin holes 55.

By the connection described above, the seed sower 10 connected to the coupler 50 via the lift arms 65 is allowed to make a horizontal swing (or yawing) motion as shown by arrow M1 in FIG. 4.

The horizontal tubing 57 described above is set in the horizontal cylinder 52 in a rotatable fashion. As best seen in FIG. 3a, round pin holes 58 are formed in the upper and lower walls of the horizontal cylinder 52, and laterally elongated pin holes 59 are formed in the upper and lower walls of the horizontal tubing 57. The pin holes 58 and the elongated pin holes 59 are aligned, and a vertical pin 60 is inserted into these holes 58 and 59 in a vertical direction. The edge of the elongated pin holes 59 of the horizontal tubing 57 can slide laterally along the pin 60.

As a result, the horizontal tubing 57 is connected to the horizontal cylinder 52 by the pin 60 in a manner so that the horizontal tubing 57 can rotate inside the horizontal cylinder 52 within the range defined by the elongated pin holes 59.

Figure 3B:
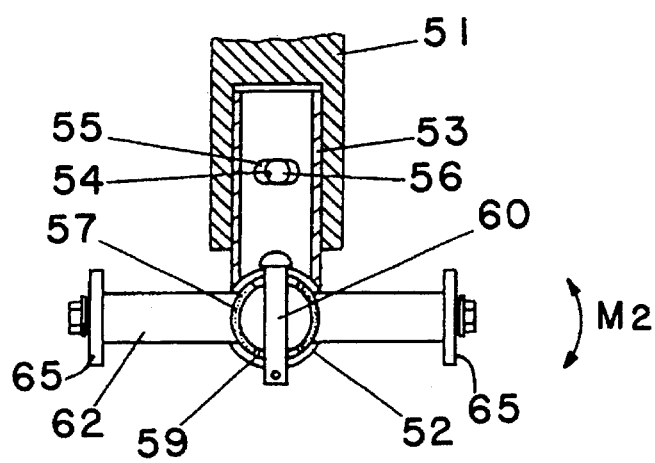

By the connection described above, the seed sower 10 connected to the coupler 50 via the lift arms 65 that are connected to the horizontal tubing 57 via the pins 62 and 63 is allowed to make a lateral swing (or rolling) motion about the horizontal tubing 57 (or the cylinder 52) as shown by arrow M2 in FIG. 3b. In addition, the lift arms 65 can swing horizontally as shown by an arrow M2' in FIG. 3a for the length of the laterally elongated pin holes 55 about the swing tube 53 (or the vertical cylinder 51).

Figure 2:
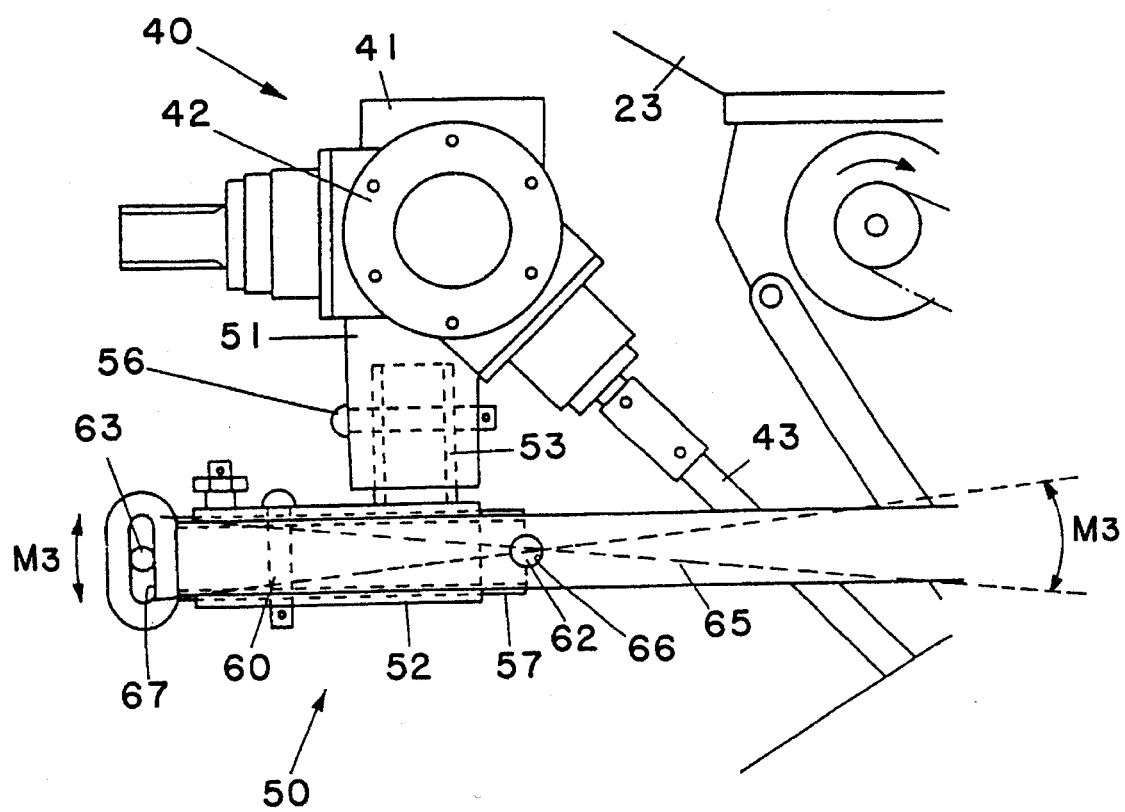
FIG. 2 is a side view of the power transmitter and the couple used in the seed sowing apparatus.

Furthermore, as best seen in FIGS. 2 and 3a, both ends of a connecting pin 62 and both ends of a restraining pin 63 are inserted into pin holes 66 and 67, respectively, which are formed in the lift arms 65. The pin 62 is horizontally fastened to the rear end of the horizontal tubing 57, and the pin 63 is horizontally fastened to the front end of the horizontal tubing 57.

More specifically, the lift arms 65 are provided with pin holes 66 at the middle portions so that the both ends of the connecting pin 62 are rotatably inserted therein. The lift arms 65 are provided also with vertically elongated pin holes 67 at the front ends so that the both ends of the restraining pin 63 is loosely inserted therein. Thus, the restraining pin 63 is free to move in a vertical direction inside the holes 67.

Thus, the lift arms 65 are connected to the connecting pin 62 and the restraining pin 63 so as to be rotatable about the connecting pin 62 as shown by an arrow M3 in FIG. 2 within the range defined by the vertically elongated pin holes 67.

By the connection described above, the seed sower 10 connected to the coupler 50 via the lift arms 65 is allowed to make an up-and-down motion as shown by arrow M4 in FIG. 1.

The lift arms 65 are connected at the rear ends to the chassis 11 of the sower 10 via the connecting pins 68 (only one shown) so that the chassis 11 is vertically rotatable about the pins 68. Two restraining pins 69 are provided on each one of the chassis 11 so that the pin 68 is located between the restraining pins 69. Thus, with these pins 69, the range of the vertical rotation of the chassis 11 with respect to the lift arms 65 is restricted.

In other words, the seed sower 10 is allowed to make a vertical swing (or pitching) motion about the pin 68 as shown by arrow M5 in FIG. 1.

In use, the connectors T2 of the tractor T are first connected to the connecting bars 44 of the seed sower 10, and the output shaft T1 of the tractor T is connected to the power transmitter 40 as shown in FIG. 4. When the tractor T is driven to advance in the direction X in FIG. 1, the two seed sowers 10 are pulled via the power transmitter 40 and couplers 50 and advance while independently moving up and down and inclining in the fore-aft and left-right directions so as to conform to the irregularities of the ground surface.

The seed sowers 10 are allowed by way of the coupler 50 to make an up-and-down motion and pitching motions via the connection in the couplers 50. Thus, it can move up and down and also incline in the fore-aft direction in conformity to the irregularities of the surface of the ground oriented in the fore-aft direction. Furthermore, the seed sower 10 is allowed to make a rolling motion too. Thus, it can easily incline in conformity to the surface of the field oriented in the left-right direction.

The driving force of the output shaft T1 of the tractor T is transmitted to the furrow-cutting claw wheels 15 via the drive shaft inside the transmission casing 41, the transmission device installed in the gear boxes 42, and the transmission shaft 43 of each sower 10. Thus, the furrow-cutting claw wheels 15 are rotated in the direction opposite from the direction of travel of the seed sower 10. As a result, furrows are cut in the ground, and the pulverized soil thrown up by the furrow-cutting process is guided rearward by the guide covers 16 and dropped to cover the furrows.

Figure 5:
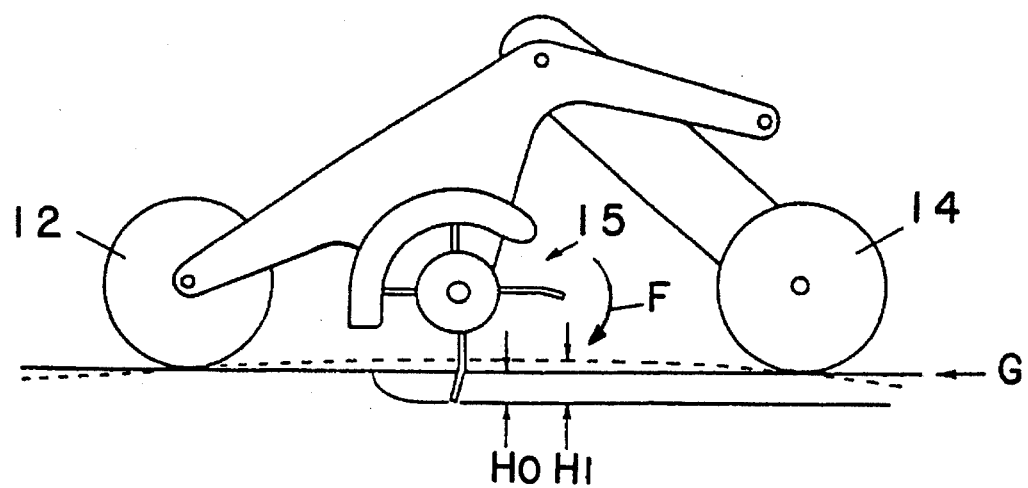
FIG. 5 illustrates the depth which the furrow-cutting claw wheels of the seed sower makes.

As seen from FIG. 5, the depth of furrow made by the furrow-cutting claw wheels 15 (in other words, the depth H0 of the sowing furrows) is roughly equal to the distance the furrow-cutting claw wheels 15 project downwardly from the ground level G defined by the front and rear wheels 12 and 14 when the ground surface is flat.

However, if there is a projection oriented in the fore-aft direction as indicated by the broken line in FIG. 5, the depth H1 of the sowing furrows is not equal to the projecting distance of the furrow-cutting claw wheels 15. The reason for this is that the conforming motion of the seed sower 10 with the ground surface equals to the average of the projection of the ground at the front and rear wheels 12 and 14 of the seed sower 10, and this average value is not always equal to the projection of the ground at the position where the furrow-cutting claw wheels 15 are provided. In the sower of the present invention, the front and rear wheels 12 and 14 can be positioned near the furrow-cutting claw wheels 15. Accordingly, the conforming motion of the seed sower 10 with respect to the projections of the ground below the furrow-cutting claw wheels 15 can be equal. Thus, furrows of equal depth are obtained.

The advantages of the seed sower of this invention in which the seed sower 10 has the front and rear wheels 12 and 14 so as to stand by itself and travel on the ground can be easily known when it is compared with a seed sower that has no front wheels and is connected to a transmission casing via a chain or universal joint.

In the seed sower without the front wheels, the front and rear supporting points of the seed sower are the transmission casing and the rear wheels, respectively, and the transmission casing follows the movement of the tractor especially the movement of the driving wheels of the tractor. Accordingly, there is high probability that the relationship between the conforming motion of the seed sower and the projection of the ground below the furrow-cutting claw wheels is worse than the seed sower that has the front and rear wheels as in the present invention. If the driving wheels of the tractor sink under the ground due to its own weight, such a relationship in the seed sower having no front wheels as described above becomes even worse.

Figure 6:
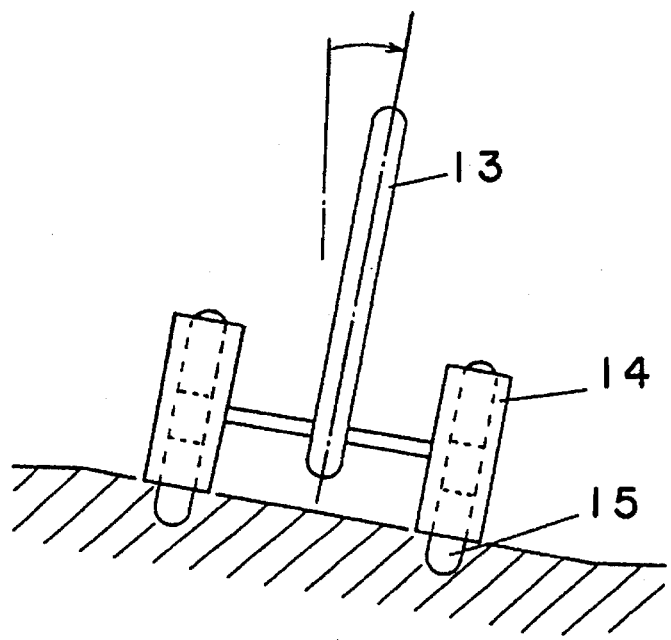
FIG. 6 illustrates the rolling motion of the seed sower.
Figure 7:
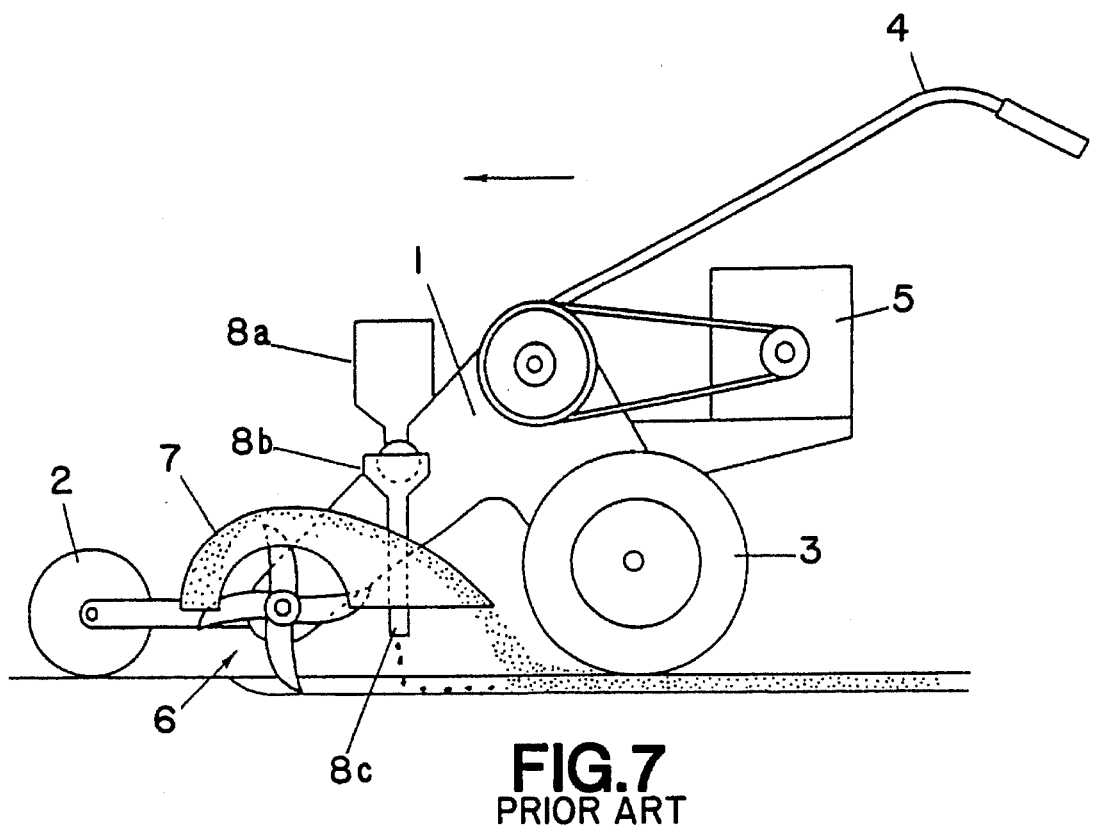
FIG. 7 is a side view of a conventional seed sower.

The left-right inclination of the seed sower 10 is illustrated in FIG. 6. The seed sower 10 of the present invention can make appropriate postures so as to conform to the inclinations of the ground surface, and the furrow-cutting claw wheels 15 can cut perpendicularly into the ground at all times. This is effective when making even depth sowing furrows in the ground.

In addition, the seed sower 10 as described above is allowed to make a horizontal swing or yawing motion. Accordingly, when the tractor changes its direction of advance by turning the steering wheel, the seed sower 10 can follow the track of the tractor T without swinging widely in the opposite direction. Thus, the traveling direction of the sower can be easily changed.

The chain mechanism inside the chain case 13 is driven as the rear wheels 14 of the seed sower 10 rotate. As a result, the pulleys 32 through 34 which are belt-connected to the pulley 22 rotate when the pulley 22 is rotated by the chain mechanism. Thus, the fertilizer, seeds and chemical agents are fed out at a predetermined amount.

The fertilizer is spread in front of the respective furrow-cutting claw wheels 15 by the fertilizer spreading tubes 25 and is thrown upward together with the pulverized soil by the claw wheels 15 and dropped behind and spread in the furrows. The seeds and chemical agents are mixed inside the seed dropping tubes 28 and put in the sowing furrows immediately after the furrows have been made. The seeds and chemical agents are then covered by the pulverized soil thrown by the furrow-cutting claw wheels 15, and this covering soil is pressed by the rear wheels 14 passing over.

As seen from the above, a tractor-drawn seed sower of the present invention can make even depth furrows and sow seeds even in unplowed fields which has numerous irregularities on the ground surface.

We claim:

1. A tractor-drawn seed sowing apparatus comprising:

a seed sower which sows seeds while traveling on a surface of ground and making sowing furrows in said ground by means of furrow-cutting claw wheels;

a power transmitter connected to a tractor so as to transmit a driving force of said tractor to said seed sower; and a coupler means for connecting said seed sower to said power transmitter; wherein:

said coupler means is constructed so that said seed sower is allowed to make up-and-down, pitching and rolling motions;

said coupler means is constructed so that said seed sower is allowed to make a yawing motion; and said coupler means includes a pair of lift arms which are connected to said power transmitter so that lift arms can make up-and-down, rolling and yawing motions, and said seed sower is connected to rear portions of said lift arms so that seed sower can make a vertical rotational motion.

2. A tractor-drawn seed sowing apparatus according to claim 1, wherein said furrow-cutting claw wheels which rotate in a direction opposite from a traveling direction of said seed sower, and said apparatus further comprises soil guide covers installed above said furrow-cutting claw wheels, and seed conduits installed behind said furrow-cutting claw wheels.

3. A tractor-drawn seed sowing apparatus according to claim 1 or 2, wherein a plurality of seed sowers are connected to said power transmitter, and a coupler is constructed so that said plurality of seed sowers are allowed to make independent up-and-down, pitching and rolling motions.

4. A tractor-drawn seed sowing apparatus comprising:

a seed sower which sows seeds while traveling on a surface of ground and making sowing furrows in said ground by means of furrow-cutting claw wheels;

a power transmitter connected to a tractor so as to transmit a driving force of said tractor to said seed sower; and a coupler means for connecting said seed sower to said power transmitter; wherein:

said coupler means is constructed so that said seed sower is allowed to make up-and-down, pitching and rolling motions;

said coupler means is constructed so that said plurality of seed sowers are allowed to make independent yawing motion; and said coupler means includes a pair of lift arms which are connected to said power transmitter so that said lift arms can make up-and-down, rolling and yawing motions, and said seed sower is connected to rear portions of said lift arms so that said seed sower can make a vertical rotational motion.

5. A tractor-drawn seed sowing apparatus comprising:

a seed sower which sows seeds while traveling on a surface of ground and making sowing furrows in said ground by means of furrow-cutting claw wheels;

a power transmitter connected to a tractor so as to transmit a driving force of said tractor to said seed sower; and a coupler means for connecting said seed sower to said power transmitter; wherein:

said coupler means is constructed so that said seed sower is allowed to make up-and-down, pitching and rolling motions;

said coupler means is constructed so that said seed sower is allowed to make a yawing motion; and said coupler means comprises:

a horizontal cylinder connected to said power transmitter so that said horizontal cylinder can rotate horizontally;

a horizontal tubing which passes through said horizontal cylinder and is connected to said cylinder in a manner that said horizontal tubing can rotate inside said horizontal cylinder;

a pair of connecting pins which are respectively horizontally attached to each end of said horizontal tubing; and a pair of lift arms rotatably connected to said pair of said connecting pins, and said seed sower is connected to rear portions of said lift arms so that said seed sower can rotate in a vertical direction.

6. A tractor-drawn seed sowing apparatus comprising:

a seed sower which sows seeds while traveling on a surface of ground and making sowing furrows in said ground by means of furrow-cutting claw wheels;

a power transmitter connected to a tractor so as to transmit a driving force of said tractor to said seed sower; and a coupler means for connecting said seed sower to said power transmitter; wherein:

said coupler means is constructed so that said seed sower is allowed to make up-and-down, pitching and rolling motions;

a plurality of seed sowers are connected to said power transmitter and said coupler means is constructed so that said plurality of seed sowers are allowed to make independent up-and-down, pitching and rolling motions;

said coupler means is constructed so that said plurality of seed sowers are allowed to make independent yawing motions; and said coupler means comprises:

a horizontal cylinder connected to said power transmitter so that said horizontal cylinder can rotate horizontally;

a horizontal tubing which passes through said horizontal cylinder and is connected to said cylinder in a manner that said horizontal tubing can rotate inside said horizontal cylinder;

a pair of connecting pins which are respectively horizontally attached to each end of said horizontal tubing; and a pair of lift arms rotatably connected to said pair of said connecting pins, and said seed sowers are connected to rear portions of said lift arms so that said seed sowers can rotate in a vertical direction.

7. A tractor-drawn seed sowing apparatus according to claim 1, 4, 5 or 6 wherein wheels are installed in front and rear portion of said seed sower so that said seed sower can stand by itself and travel on said ground, said furrow-cutting claw wheels being installed between said wheels installed in said front and rear portion.

8. A tractor-drawn seed sowing apparatus according to claim 1, 4, 5 or 6 wherein said furrow-cutting claw wheels rotate in a direction opposite from a traveling direction of said seed sower, and said apparatus further comprises soil guide covers installed above said furrow-cutting claw wheels, and seed conduits installed behind said furrow-cutting claw wheels.

9. A tractor-drawn seed sowing apparatus according to claim 1, 4, 5 or 6, wherein said coupler means comprises a plurality of couplers connected to said power transmitter, said seed sower is connected to each one of said plurality of couplers, and each of said plurality of said couplers is constructed so that said seed sower connected thereto is allowed to make independent up-and-down, pitching and rolling motions.

10. A tractor-drawn seed sowing apparatus according to claim 5 or 6 wherein front portions of said lift arms are provided with pin holes that engage with one of said pair of connecting pins so that a rotational motion of said lift arms is restricted to a predetermined range in a vertical direction defined by said pin holes.

* * * * *